United States Patent [19]

Parkinson

[11] 4,193,872

[45] Mar. 18, 1980

[54] FLUSHING SYSTEM FOR REVERSE OSMOSIS WATER PURIFICATION UNITS

[76] Inventor: Wayne A. Parkinson, 800 E. St. Louis Ave., Las Vegas, Nev. 89105

[21] Appl. No.: 932,289

[22] Filed: Aug. 9, 1978

[51] Int. Cl.$^2$ ............................................. B01D 41/00
[52] U.S. Cl. ..................................... 210/143; 210/409
[58] Field of Search ................ 210/23 H, 257 M, 449, 210/321 R, 130, 143, 134, 181, 409

[56] References Cited

U.S. PATENT DOCUMENTS

| | | | |
|---|---|---|---|
| 3,670,892 | 6/1972 | Baerg et al. | 210/321 R X |
| 3,726,793 | 4/1973 | Bray | 210/321 R X |
| 3,747,763 | 7/1973 | Kain | 210/321 R X |
| 3,967,638 | 7/1976 | Tondreau | 210/321 R X |

Primary Examiner—Benoit Castel
Assistant Examiner—E. Rollins Cross
Attorney, Agent, or Firm—Seiler & Quirk

[57] ABSTRACT

A reverse osmosis water purification system for home usage is flushed periodically automatically by actuation of a non-related apparatus. In one embodiment, the reverse osmosis cartridge is mounted directly in the cold water line to a sink, such that water passes through the cold water inlet through the contaminated water outlet to the cold water faucet to the sink, flushing contaminants out of the cartridge through the faucet when the faucet is opened. In another embodiment, flushing is actuated by a solenoid-operated valve electrically connected to a garbage disposal switch.

6 Claims, 2 Drawing Figures

FLUSHING SYSTEM FOR REVERSE OSMOSIS WATER PURIFICATION UNITS

BACKGROUND OF THE INVENTION

Reverse osmosis water purification units for providing pure water for drinking and cooking are now in wide use. For home usage, these systems generally comprise a cold water source under pressure, a filter cartridge having a cold water inlet, a purified water outlet, and a brine outlet, a purified water storage tank, and a purified water faucet. The cartridge contains a semipermeable membrane for separating salts and other contaminants from the feed water.

Improvements in the design and manufacture of reverse osmosis cartridges permits the installation of a unit which produces several gallons per day of pure water, including a storage tank, in very small areas, e.g., under a kitchen sink. Most cartridges designed for home use employ a spiral-wound module where a purified water collection channel is formed between two sheets of membrane, all of which are wrapped around a perforated product water tube. Water flows through the membrane and into the water collection channel, eventually accumulating in the product water tube. The spiral-wound elements take the form of an elongated cylinder having a feed water inlet at one end, and purified water and contaminated water outlets at the other end. An example of such a cartridge is described in Bray, U.S. Pat. No. 3,504,796.

A difficulty which persists in residential reverse osmosis purification units is the tendency of the cartridge to become fouled on the feed water side of the membrane. The membrane may become clogged with small particulate matter, or an unduly high concentration of impurities which have been separated from the water may create scale and/or greatly reduce the efficiency of the separation process. While it is customary to have a very small, continuous flow of feed water through the apparatus, any flow greater than a few ounces per minute wastes a substantial amount of water and creates unnecessary expense. On the other hand, a very low flow (e.g., less than 3 ounces per minute) is insufficient to sweep the impurities away from the unit. Additionally, very low flows of impure water through restricted orifices tend to form deposits on the orifices, eventually restricting and shutting off the flow entirely.

One method of dealing with this problem has been to provide a hand-operated valve on the feed water line to the cartridge permitting a user to open the valve and flush the unit thoroughly with a high flow of feed water. Normally, depending on the quantity and types of impurities in the feed water, users are instructed to flush the cartridge for several minutes every day. Experience has shown, however, that while many users diligently follow instructions immediately subsequent to installation of a purification unit, after a short period of time daily flushing does not occur. Indeed, many users forget to flush the cartridge for months at a time, resulting in very poor purification performance.

Accordingly, it is an object of the invention to provide a reverse osmosis water purification system which will flush automatically without the user specifically intending to flush the system. It is another object of the invention to provide a water delivery system which will flush upon the occurrence of a user's opening a cold water faucet in a sink. It is yet another object of the invention to provide a reverse osmosis water purification system which will flush upon the actuation of a non-related electrical circuit. These and other objects of the invention are accomplished by the system of the invention, a preferred embodiment of which is set forth herein.

BRIEF DESCRIPTION OF THE DRAWINGS

The invention is best understood with regard to the drawings, in which.

DETAILED DESCRIPTION OF THE INVENTION

Figure 1:
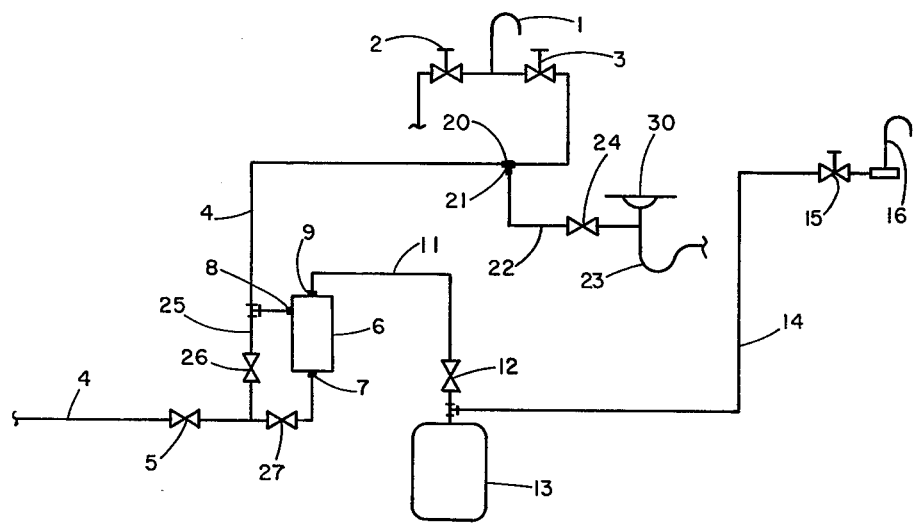
FIG. 1 is a schematic flow diagram of a reverse osmosis water purification system having the membrane-containing cartridge installed in the cold water line to a sink.

A reverse osmosis water purification system having a membrane cartridge attached directly in the cold water line of a sink is shown in FIG. 1. All of the components used in the system are conventional; the invention resides in the particular method of connecting these components.

Referring to FIG. 1, a conventional sink (not shown) is equipped with faucet 1 having hot water control valve 2 and cold water control valve 3. A supply of cold water is obtained from a pressurized source (not shown), such as a municipal water supply, and is carried to the sink in conduit 4. Shutoff valve 5 enables the water supply to be closed off for maintenance or installation work. In accord with the invention, a conventional reverse osmosis membrane cartridge 6 having feed water inlet port 7, concentrate outlet 8, and product water outlet 9 is attached in the cold water line. Conduit 4 carrying cold water from its source to the faucet is connected to the feed water inlet 7 and the concentrate outlet 8 from which the conduit proceeds to the sink faucet 1 which is controlled by valve 3.

Purified product water exits cartridge 6 through outlet 9 and is carried through conduit 11 through shutoff valve 12 into storage tank 13. The storage tank may be any kind of storage tank from which water may be pumped, but is preferably a diaphragm tank having a flexible diaphragm which separates the interior of the tank into two compartments. One compartment is pressurized through a valve, such as a bicycle tire valve (not shown), with a small amount of air; the other compartment is used for water storage. As water fills the tank, the air in the other compartment is further compressed, providing a driving force for the water. Product water is drawn from the tank through line 14 to faucet 16. On-off valve 15 controls the flow of purified water through the faucet.

Also connected in cold water inlet line 4 is a tee 20 having a lower nipple 21 which is connected to sink drain 23 through conduit 22. Valve 24 enables this line to be shutoff. Nipple 21 has a very small orifice which permits continual flow of water through the cold water inlet line and down into the sink drain for a very small continuous flushing of the cartridge. Preferred quantities of continual drainage are from about 3 to about 10 ounces per minute of water, preferably about 5 ounces per minute of water.

Additional plumbing which may optionally be used in the system of the invention comprises a cartridge bypass line 25 having valve 26, and an additional valve 27 downstream of the by-pass inlet on the cold water feed line. Under normal operating conditions, valves 5 and 27 are open and valve 26 is closed, permitting continual flow of water through conduit 4 and out pinhole drain 21 of tee 20 into drain 23. Water is processed through the semipermeable membrane in cartridge 6, and product water passes through line 11 and fills tank 13. The very small continuous flow through the high pressure side of the membrane and out the concentrate/cold water line prevents scale formation and deterioration of the membrane.

As is readily seen from the flow diagram, flushing of the membrane is accomplished each time the cold water valve 3 is opened to permit water to flow through faucet 1. Any contaminants accumulating in the line will first be flushed through the faucet and down drain 30 and line 23 in the sink. Accordingly, each time the cold water is turnd on in the sink the cartridge will automatically be flushed.

In the event that it is desired not to use the water purification system for any period of time, the unit can be bypassed by opening valve 26 in bypass conduit 25 and closing valve 27 in the cartridge inlet line. This also provides an easy mechanism for removing the cartridge for repair or replacement.

Figure 2:
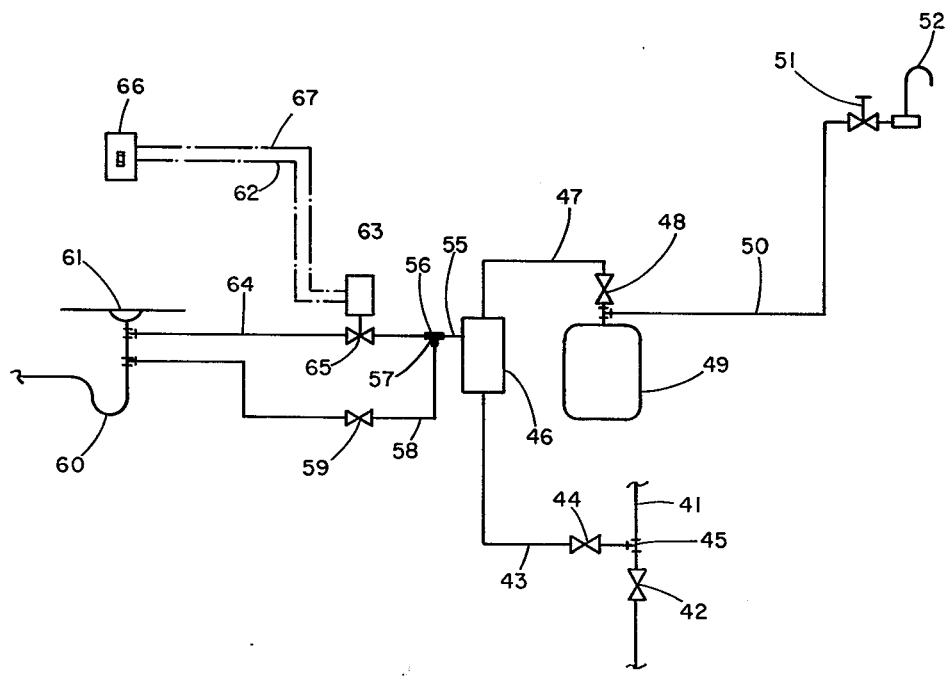
FIG. 2 is a schematic flow diagram of a system wherein flushing of the cartridge is actuated by an electrical switch used to control a garbage disposal unit.

An alternate system which also provides automatic flushing of the cartridge on an occasional basis is shown in FIG. 2. Main cold water line 41 is fitted with a tee 45 and valve 42; feed water line 43 extends from the tee through valve 44 to reverse osmosis purification cartridge 46. Purified product water exits the cartridge through line 47, valve 48, and enters storage tank 49 where it is held for use. The purified water is summoned by opening valve 51, permitting flow of water from the high pressure tank through line 50 and through the purified water faucet 52. Storage tank 49 is a membrane tank as described earlier.

Impure concentrate flows through concentrate port 55 to tee 56, which is similar to tee 20 in FIG. 1. A small flow of water passes continuously through the bottom nipple 57 of the tee, passing through line 58, valve 59, and into drain 60 of sink 61. This flow is on the order of 5 ounces per minute of water containing concentrates from the high pressure side of the purification membrane.

Flushing is accomplished by opening valve 65 on line 64 which extends from tee 56 to drain 60. This valve opens line 64 and permits a full flow of water from main line 41 through cartridge 46 and out to the drain. This flow may be as high as 5 to 10 gallons per minute. Valve 65 is operated by solenoid 63 which is actuated by wall switch 66 which is electrically connected through lines 67 and 62 to the solenoid. Switch 66 is typically an electrical switch used to turn on and off a garbage disposal (not shown) located in the drain portion of sink 61. It is typical for users to operate a garbage disposal unit in their kitchen sink several times a day for a period of 30 to about 90 seconds. Connection of the flushing system for the reverse osmosis purification unit to the switch for the garbage disposal unit enables the flushing to occur at least once, and preferably several times a day for short periods of time. This is the most desirable flushing schedule for the unit, and its actuation does not depend upon a user remembering to specifically flush the system.

Water storage tanks 13 and 49 are conventional units; typical examples are disclosed in Brown, U.S. Pat. No. 3,568,843. Alternative water storage means comprises a standard storage tank with a small pump, such as a centrifugal pump, which is used to deliver water from the tank to the faucet. The reverse osmosis cartridge is also a conventional unit; these cartridges are commercially available from Hydranautics Water Systems of Goleta, Calif., and Osmonics, Inc., of Hopkins, Minn. Similar cartridges operating on a somewhat different principal, by accomplishing the same result, are marketed by DuPont under the tradename Permasep. A discussion of the principles and practicalities of water purification by reverse osmosis is found in an article entitled "Reverse Osmosis: Moving from Theory to Practice", *Consulting Engineer*, November 1975, Volume 45, No. 5, Pages 55 through 61.

While the invention has been described with respect to two preferred embodiments thereof, it will be apparent to those skilled in the art that alterations and changes may be made within the spirit and scope of the invention, which relates to a flushing system for a reverse osmosis water purification unit whereby the flushing system is temporarily actuated by an incident unrelated to the reverse osmosis unit. Accordingly, the invention should be considered limited only by the following claims.

I claim:

1. In a water delivery system for a sink having a cold water faucet, a separate purified water faucet, and a drain, a water source, a reverse osmosis water purification cartridge having a feed water inlet connected to the water source upstream of the cold water faucet, a purified water outlet, and a contaminated water outlet, the improvement therein which comprises a flow control means for automatically periodically increasing flow from the water source through the feed water inlet for short periods of time, said flow control means comprising either the cold water faucet or a solenoid-operated valve actuated by an on/off switch to a garbage-disposing apparatus.

2. The system of claim 1 wherein the contaminated water outlet is directly connected to the cold water faucet such that when said faucet is open, water passing through the faucet passes first through the feed water inlet, then through the contaminated water outlet, and then through the faucet.

3. The system of claim 2 having bypass means for directing flow from a location upstream of the feed water inlet to a location downstream of the contaminated water outlet, and valve means for flow control in said bypass means.

4. The system of claim 1 wherein the flow control means comprises a solenoid, a valve actuated by the solenoid, and means electrically connecting said solenoid to the switch of a garbage disposing apparatus such that the valve is opened when the garbage disposing apparatus is actuated.

5. A water delivery system comprising a water source; a sink having a cold water faucet, a separate purified water faucet, and a drain; a reverse osmosis water purification unit having a feed water inlet, a purified water outlet, and a contaminated water outlet; first conduit means connecting the water source to the feed water inlet upstream of the cold water faucet, and second conduit means for connecting the contaminated water outlet to the cold water faucet, the system being connected such that when the cold water faucet is opened, the path of flow of water to the cold water faucet is from the water source, through the feed water inlet, through the contaminated water outlet, and to the cold water faucet.

6. The system of claim 5 also comprising third conduit means connecting the second conduit means and the drain, and flow-restricting means for maintaining a small, constant flow of water in said third conduit means.

* * * * *